United States Patent [19]
McMahon

[11] 4,199,429
[45] Apr. 22, 1980

[54] PILOT LIGHT ASSEMBLY FOR ELECTROSTATIC FLUID TREATERS

[75] Inventor: Roy C. McMahon, Kansas City, Mo.

[73] Assignee: Electrostatic Equipment Company, Kansas City, Mo.

[21] Appl. No.: 904,405

[22] Filed: May 10, 1978

[51] Int. Cl.² .............................................. B03C 9/00
[52] U.S. Cl. ................................................. 204/302
[58] Field of Search .............. 204/279, 302, 305, 308, 204/149

[56] References Cited

U.S. PATENT DOCUMENTS

| | | | |
|---|---|---|---|
| 3,202,601 | 8/1965 | Green | 204/302 |
| 3,489,669 | 1/1970 | Ruhnke | 204/302 |
| 4,012,310 | 3/1977 | Clark et al. | 204/305 |
| 4,073,712 | 2/1978 | Means et al. | 204/186 |

*Primary Examiner*—Howard S. Williams
*Attorney, Agent, or Firm*—Fishburn, Gold & Litman

[57] ABSTRACT

A pilot light assembly for use in an electrostatic fluid treater, having spaced inner and outer electrodes, includes a pilot light mounted on a conductive fitting receivable in an aperture through an end of the outer electrode, the fitting being connected to one of the pilot light terminals. A divergent spring wire contact is connected to the other pilot light terminal through a dropping resistor. The divergent spring wire contact has free ends which are resiliently urged through the aperture into electrical contact with the interior surface of the inner electrode, whereby the light, when energized, is a positive indication of a high voltage across the electrodes.

11 Claims, 4 Drawing Figures

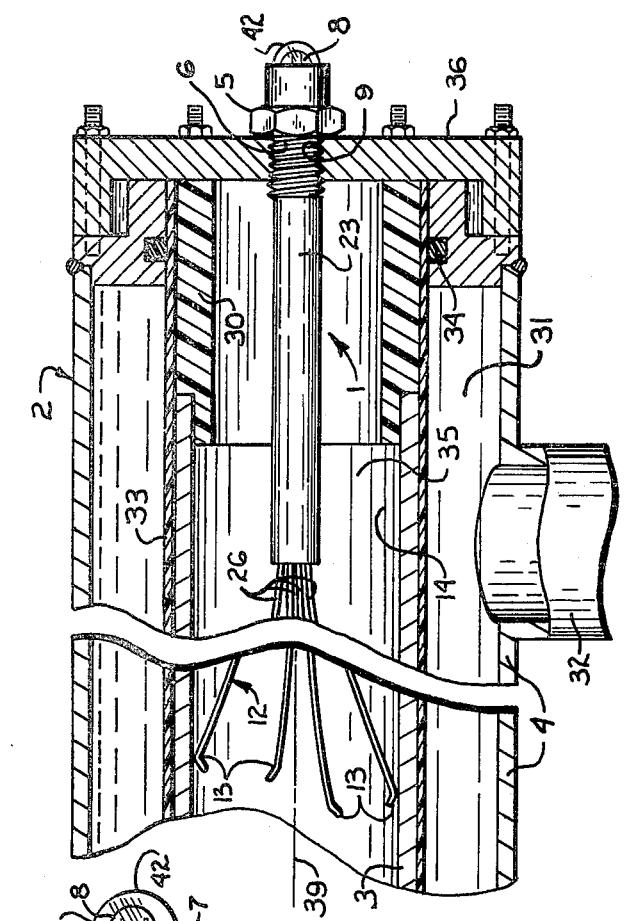
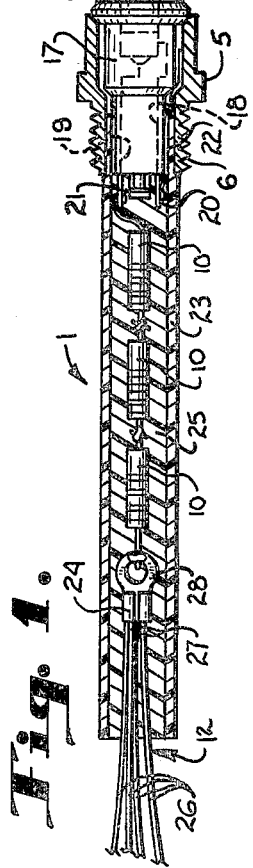
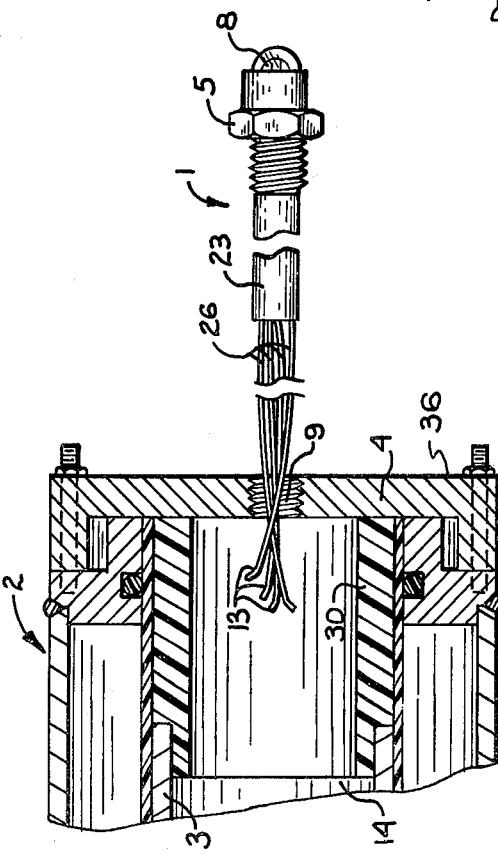
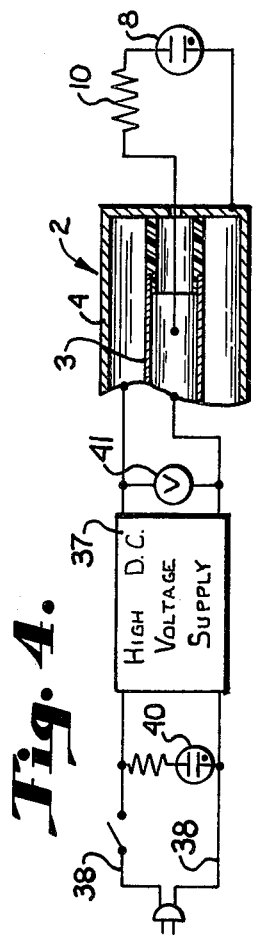

PILOT LIGHT ASSEMBLY FOR ELECTROSTATIC FLUID TREATERS

The present invention relates to electrostatic fluid treaters and more particularly to a treater mounted pilot light assembly.

In an electrostatic fluid treater, for example, of the type described in U.S. Pat. No. 4,073,712, which often includes a voltage supply with an illuminated pilot light, the pilot light is not necessarily an indication that a voltage is applied across the treater electrodes. Most pilot lights are placed across either the AC supply line or the DC output line and actually indicate only that an AC voltage is being applied to the power transformer or that the DC voltage supply has a voltage available. In many cases, the pilot light will be energized without even connecting the supply to the treater. Similarly, a voltmeter placed across the supply output would only indicate available voltage and an open circuit in one of the conductor leads to the electrode caused by accident, corrosion, poor workmanship or the like would not be signalled.

One positive indication of voltage across the treater electrodes is a signal device connected directly to the electrodes, preferably, on parts of the electrodes themselves remote from the supply connections. However, at least one of a pair of high voltage treater electrodes are, necessarily, inaccessible for reasons of safety as well as construction. Generally, the outer electrode is bare metal at ground potential, and the inner electrode is mounted completely within the outer electrode such that direct contact voltage measurements or indications are not easily made.

The present invention overcomes the above difficulties and further provides an electrode voltage indicator which can be readily inspected.

The principal objects of the present invention are: to provide an improved operating indicator for an electrostatic fluid treater; to provide such an operating signal comprising a pilot light assembly mounted on and directly connected to the electrodes of a treater; to provide such an assembly which can be readily viewed to ascertain whether a voltage is impressed across the electrodes; to provide such an assembly having a light bulb which can only be energized by the application of the proper operating voltage across the electrodes of the treater; to provide such an assembly which includes a novel divergent spring wire contact having portions thereof which are resiliently urged into electrical contact with the interior surface of a hollow inner electrode; to provide such a pilot light assembly which may be included on newly manufactured treaters and which also may be conveniently retrofitted to existing treaters; to provide such a pilot light assembly which is safe to install and operate and which is not easily damaged in operation; and to provide such a pilot light assembly which is economical to manufacture, durable and positive in function and which is particularly well adapted for its intended purpose.

Other objects and advantages of the present invention will become apparent from the following description taken in connection with the accompanying drawings wherein are set forth, by way of illustration and example, certain embodiments of this invention.

The drawings constitute a part of this specification, include an examplary embodiment of the present invention, and illustrate various objects and features thereof.

FIG. 1 is a fragmentary longitudinal sectional view of the pilot light assembly of the present invention.

Fig. 2 is a fragmentary longitudinal sectional view, on a reduced scale, of an electrostatic water treater having the pilot light assembly installed thereon.

FIG. 3 is a fragmentary view showing the pilot light assembly during an early stage of insertion.

FIG. 4 is a diagrammatic view of a voltage supply connected to a portion of an electrostatic water treater and a schematic representation of the pilot light and dropping resistor connected to the electrodes of the treater.

Referring to the drawings in more detail:

The reference numeral 1 generally designates a pilot light assembly for installation on an electrostatic treater 2, such as a water treater, to indicate the presence of a voltage across the inner electrode 3 and the outer electrode 4 thereof. The assembly 1 includes a fitting 5 having a conductive mounting member or sleeve 6 connected to one of the terminals 7 of a light bulb 8 and receivable in a tapped aperture 9 of the outer electrode 4. The assembly further includes a dropping resistor 10, or a plurality thereof, connected to the other terminal 11 of the bulb 8 and a divergent spring wire contact means 12 having a plurality of free ends 13 resiliently urged into electrical contact with the interior surface 14 of the hollow inner electrode 3.

In the embodiment illustrated in FIG. 1, the pilot light assembly 1 includes a pilot light socket 17 mounted in the fitting 5. The socket 17 may be a conventional pilot light socket having means therein for removably mounting a bulb such as a screw arrangement or a bayonet arrangement (not shown). The socket 17 includes conductive portions thereof or conductors 18 and 19 connected respectively to the bulb terminals 7 and 11. The conductors 18 and 19 are connected to socket terminals 20 and 21. The illustrated pilot light assembly 1 includes a resilient contact 22 connected to the socket terminal 20 and positioned in contact with the conducted sleeve 6 of the fitting 5. The resistors 10 are connected to the socket terminal 21.

A non-conductive tube 23 is received in the open end of the conductive sleeve 6 and has the resistor 10 and one end 24 of the spring wire contact 12 protectively mounted therein. Preferably, the tube 23 is filled with non-conductive potting material 25 which encapsulates the circuit elements including resistors 10 and the end 24 of the spring wire contact 12 therein. In the illustrated embodiment, the potting material 25 may be employed to retain the socket 17 and the tube 23 in proper position in relation to the fitting 5.

The spring wire contact 12 includes a plurality of curved spring wires 26 joined at the end 27 of each wire opposite the free end 13 and connected to the resistors 10. The ends 27 may be joined in any convenient manner, such as by soldering the ends 27 together and clamping a crimp type terminal 28 thereon and soldering the terminal 28 to one of the resistors 10. As illustrated in FIG. 2, the free ends 13 of the spring wires 26 diverge radially and are spaced apart diametrically a normal distance greater than the interior diameter of the inner electrode 3 of the treater 2 on which the assembly 1 will be installed. As shown in FIG. 2, the free ends 13 are bent or hooked inwardly to aid operational insertion and, further, to help prevent damage or injury from the outwardly extending ends of the spring wires 26.

FIG. 2 illustrates a typical electrostatic water treater 2 with which the pilot light assembly 1 may be used.

The treater 2 includes the hollow inner electrode 3 coaxially mounted within the outer electrode 4 by means such as the annular insulator 30. The treater 2 includes a flow passage 31 communicating with a conduit 32 which may be either an inlet or an outlet. The inner electrode 3 includes dielectric covering 33, such as teflon, to prevent current flow between the electrodes 3 and 4. Cooperation between an O-ring 34 and the insulator 30 seals the flow passage at the ends of the treater 2 to prevent fluid from leaking into the interior 35 of the inner electrode 3 and possibly causing a short circuit. The outer electrode 4 includes an end 36 which is opposite the end through which the power supply leads are fed (not shown). The end 36 is provided with the tapped aperture 9 which is adapted to receive the threaded, conductive sleeve 6 therein for electrical contact therewith. Alternatively some other locking means besides threading could be employed to retain the assembly 1 in its mounted position, such as a spring lock bayonet arrangement (not shown) or the like.

The assembly 1 is mounted on the treater 2 by gathering the free ends 13 of the spring wire contact 12, inserting the ends 13, the spring wires 26, the tube 23, and the conductive sleeve 6 into the aperture 9 (FIG. 3), and screwing the fitting 5 securely into the threaded aperture 9. For safety, it is recommended that the power supply 37 (FIG. 4) be turned off or disconnected from the AC line 38 and, further, that the filter capacitors (not shown) of the power supply 37 be discharged before attempting to install the assembly 1 on the treater 2. Contact between the conductive sleeve 6 and the aperture 9 connects the bulb terminal 7 to the outer electrode 4. Inside the inner electrode 3, the free ends 13 diverge resiliently rearwardly and rdially outwardly from a common axis 39 and engage the interior surface 14. It is only necessary that one free end 13 make electrical contact with the surface 14 for the bulb terminal 11 to be connected to the inner electrode 3; however, for increased electrical contact reliability several are provided, each of which tends to scrape the engaged portion of the interior surface 14 clean as the assembly is rotated (screwed) into operational, mounted position.

Referring to FIG. 4, a pilot light 40 across the AC line 38 only indicates that an AC voltage is connected to the DC voltage supply 37. Similarly, the voltmeter 41 across the output of the supply 30 only indicates the DC voltage available to the treater 2. Neither the light 40 nor the voltmeter 41 has the ability to positively indicate that a voltage is actually being applied to the electrodes 3 and 4 of the treater 2. However, the pilot light 8 of the present invention is connected directly to the electrodes and, hence, can only be energized when a voltage actually exists across the electrodes. Therefore, the pilot light 8 is a reliable indicator of the operability of the treater 2.

The illustrated treater 2 is provided with 3,000 volts DC for operation. The bulb 8 may be any suitable type of bulb, such as an NE-51 neon bulb or the like. The assembly 1 is provided with 60 megohms dropping resistance for the NE-51 bulb at 3,000 volts, conveniently provided by three 20 megohm resistors connected in series. The resistors 10 are two watt resistors to insure long life thereof. When it is necessary to replace the bulb 8 because of burn out or breakage, the old bulb may be easily removed and a new one inserted. The assembly 1 includes a removable, colored transparent lens 42, preferably red for good visibility, to provide protection for the bulb 8.

While certain forms of the present invention have been described and illustrated, it is not to be limited thereto except insofar as such limitations are included in the following claims.

What is claimed and desired to secure by Letters Patent is:

1. In combination with an electrostatic fluid treater having a pair of electrodes, a signal assembly comprising:
   (a) a signal device having a pair of electrical terminals;
   (b) a mounting member retaining said signal device with respect to said treater in a position for inspection;
   (c) first means electrically connecting one of said signal device terminals to one of said treater electrodes;
   (d) second means electrically connecting the other of said signal device terminals to the other of said treater electrodes; and
   (e) said second means including at least one elongated spring member in resilient engagement with said other treater electrode, whereby said signal device is energized only when a voltage is applied across said electrodes, said other treater electrode being an inner electrode at least partially surrounding by said one electrode.

2. An assembly as set forth in claim 1 wherein:
said signal device is a light bulb and includes a resistor connected between one of said electrodes and one of the terminals of said bulb.

3. An assembly as set forth in claim 1 wherein:
(a) said treater includes opposite ends thereof;
(b) voltage supply means is connected across said electrodes at one of said treater ends for supplying operating voltage to treat a fluid therein; and
(c) said signal assembly is connected across said electrodes at the other of said treater ends.

4. An assembly as set forth in claim 1 wherein:
(a) said inner electrode being hollow with an interior conductive surface accessible through means forming an aperture in said one electrode, said one electrode being an outer electrode containing said inner electrode;
(b) said mounting member includes a fitting receivable into said aperture; and
(c) a plurality of said spring members project from said mounting member into resilient engagement with said interior surface.

5. An assembly as set forth in claim 4 wherein:
said spring contact members are curved wires which cooperatively diverge outwardly from a common axis.

6. An assembly as set forth in claim 5 wherein:
said curved wires diverge from a common junction within said hollow inner electrode.

7. An assembly as set forth in claim 4 wherein:
(a) said fitting is threaded; and
(b) said aperture forming means is tapped for threadedly receiving said fitting.

8. An assembly as set forth in claim 4 wherein:
(a) said mounting member includes an elongated tube extending into said hollow inner electrode; and
(b) said spring members diverge from said tube.

9. An assembly as set forth in claim 8 including:
(a) circuit elements in said tube; and wherein:

(b) said tube is filled with non-conductive potting material encapsulating said elements and a portion of said spring members.

10. In combination:
(a) a pilot light assembly and an electrostatic fluid treater having an inner hollow electrode with an interior conductive surface which is accessible through means forming an aperture in an outer electrode thereof;
(b) said assembly including:
   (1) a pilot light socket having a pair of conductors,
   (2) a light bulb received in said socket, said bulb having a pair of terminals connected respectively to said socket conductors,
   (3) a conductive mounting member on said socket connected to one of said socket conductors,
   (4) a resistor connected to the other of said socket conductors, and
   (5) spring contact means connected to said resistor; and
(c) said assembly being mounted on said treater with said conductive mounting member received in said outer electrode aperture and in electrical contact with said means forming said aperture, and with said spring contact means extending into said inner electrode and resiliently urged into electrical contact with said interior surface, whereby said light bulb is energized only in response to the application of a treater operative voltage across said electrodes.

11. An assembly as set forth in claim 10 wherein said spring contact means comprises:
(a) a plurality of elongated, curved wires joined at one end of each wire to form an electrical junction, each wire having a free end, the free ends of said wires diverging radially; and wherein:
(b) said junction is connected to said resistor; and
(c) said free ends are resiliently urged into electrical contact with said inner electrode interior surface.

* * * * *